Feb. 5, 1924.
J. H. BAIR
COUNTER
Filed Oct. 29, 1917
1,482,539
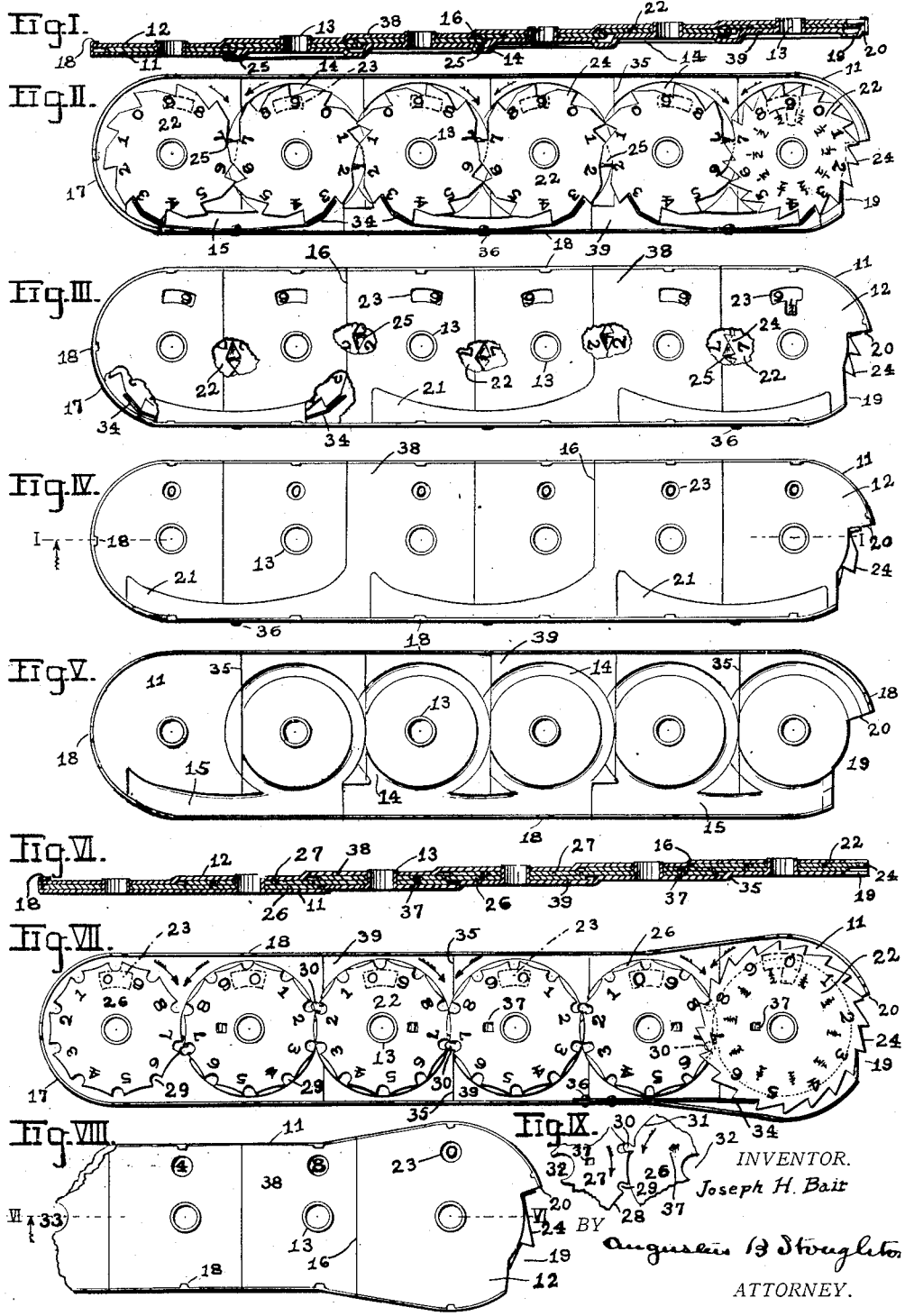
INVENTOR.
Joseph H. Bair
BY
Augustus B Stoughton
ATTORNEY.

Patented Feb. 5, 1924.

1,482,539

UNITED STATES PATENT OFFICE.

JOSEPH H. BAIR, OF PHILADELPHIA, PENNSYLVANIA.

COUNTER.

Application filed October 29, 1917. Serial No. 198,958.

*To all whom it may concern:*

Be it known that I, JOSEPH H. BAIR, a citizen of the United States, and residing in Philadelphia, Pennsylvania, have invented certain new and useful Improvements in Counters, of which the following is a specification.

My invention relates to counters of the class adapted to keep a score and to register on the dial thereon the number of times an act, or operation, is repeated. It is suitable in form to be fastened on a machine to count revolutions or reciprocating movements thereof and it can be arranged in a series to keep a record of selective operations thereof. Such as for example, in a railroad ticket issuing machine, a counter would be provided for each destination to keep a record of the tickets issued to each destination. The counter is also of convenient form to be carried in an inside pocket, and to be held in the hand in taking a count, for example of passersby.

The primary object of the invention is to provide a counter capable of counting by units, and by halves, as desired. The units wheel has two teeth exposed by means of which to actuate the counter. When it is turned the distance of one tooth a half is added to the total shown in the dial, and when moved by two teeth a unit is added.

The counter is suitable to be placed in a compact series, tight together, tilted at a required angle and overlapping (like shingles) so that the dial exposed shows its reading to the best advantage. The series can be placed under a glass or transparent cover to keep out dust and from being tampered with. Only one counter driver, shiftable with reference to the counter series with which it selectively co-operates, is required. This driver has a fixed stroke the distance of the two teeth exposed on the counter and there are selective means for causing the counter to make strokes corresponding to two teeth in length or to idle during a portion of such strokes and so count "halves" and the driver can be made to co-operate with any counter of a series by moving the counter and the series relatively. This counter, being much lighter in weight than commercial counters now available, can be practically grouped on a manually shiftable selective device, in various ways, as, for example, radially disposed around the shaft of a turn-stile, or side by side, tilted and partly overlapping to expose the reading dial of each in the uncovered position, in the case of a sliding selector.

To these ends I provide the counter of the construction and operation illustrated in the accompanying drawings and hereinafter fully described and claimed.

In the drawings:—

Figure I is a longitudinal cross section on line 1—1 of Figure IV showing how the counter wheels overlap and are confined between the top and bottom walls of the terraced casing in which is spun a flanged hub for each of the counter wheels.

Figure II is a plan view of a preferred form of the counter with the top cover removed showing all the counter wheels in operative position and showing 999999 in the windows indicated. In this position when the units wheel is moved forward one notch (of the two) all the wheels will be carried forward, as indicated by the arrows, a half step into the position in which they are shown in Figure III.

Figure III is a plan view with the top cover on with certain parts thereof cut away to show the action of the carrying mechanism and the springs. The amount of the number expressed in Figure II is shown in the windows after the units wheel is moved a notch showing said number increased by a half.

Figure IV is a plan view of the counter arranged to count by units only. The windows are not extended as in the half counter shown in previous figures and the units wheel has not half steps but unit steps like the wheels of the higher denominations.

Figure V is the bottom housing case for either form shown above. On it is shown a cut-away at the units end to expose the required teeth of the units wheel; a flange around the edge; bearing hubs for the wheels; clearance races for the carrying lug on each wheel but the last; clearance places for the springs and stepped faces supporting the hubs.

Figure VI is a longitudinal cross section on line VI—VI of Figure VIII of an alternative form of the counter, similar to Figure I.

Figure VII is a plan view, with cover removed, of an alternative form of my half counter, showing the working arrangement of the counter wheels thereof; also the position and form of the windows in the removed cover is indicated.

Figure VIII is a plan view of this counter with the top cover arranged like Figure IV to count by units only.

Figure IX is a fragment of two articulating wheels in operative relation to each other, showing how the actuated wheel is locked by the actuator against rotation and once in the revolution of the latter is carried a step by it.

The machine is housed by the two stairway like plates 11 and 12 made to conform to each other and are enclosed and held properly spaced by means of flange 17 on the base plate with ear 18 thereon to turn over on the top plate to hold the case rigidly together. On the base plate 11 is a series of bearing flanges 13 and concentric with them respectively are carrying pin race-ways 14, and at the lower margin clearance places 15 for the springs. On the top cover superposed with 15 are spring spaces 21. On the top cover also are risers 16 and on the bottom plate risers 35 between the respective parallel faces 38 and 39. The elements 16 are called "risers" in analogy to the boards which connect the treads of a stair-case, or in other words, because they are the elements which extend crosswise between parallel planes rising from one plane to the other. In the top cover are windows 23. Common to both plates and at the units end is a cutout 19 to expose the teeth 24 of the units counter wheel 22. At the top of the cut-out is a stop 20 which is formed by the casing plates 11 and 12.

On one of the teeth 24 of each counter wheel 22 (except that of highest denomination) is a face pin 25 which once in a revolution carries the wheel of next higher denomination, into whose plane it extends, one step. In the alternative type of counter which my invention embodies each counter wheel 22 is made up of two superposed disks 26 and 27, which are held rigidly together in their turning relation by means of a slot and pin 37 (Figures VI to IX). Underlying the units wheel which is identical with the units wheel of the preferred form of counter (illustrated in Figures I to V), except for the carrying pin 25, is a circular disk 26, revolving rigid with it, and having thereon a carrying tooth 30 projecting from its circular edge face 31. Each succeeding higher denomination wheel 22 has its under member 26 identical with this first one. But the corresponding upper member thereof instead of being a ratchet as in the units wheel (and as are all the wheels of the preferred type, is a disk 27 with concave edges and notches 29 therein equally spaced around its edge. These concave edges 28 of disk 27 successively conform to the circular rim 31 of disk 26 thus holding disk 27 against rotation until lug 30 engages notch 29 and carries disk 27 a step to conform the adjacent concave edge thereon, thus advanced, to the rim. The wheels 22 are so stepped or terraced that the under members 26 thereof are in the planes respectively of the upper members 27 and in the operative relation just described. All the wheels have a large bearing hole 32 by which to mount them on their proper hub 13. A hole 33, for each hub 13, in the top case allows its respective hub to project through, thus being a means of aligning the two covers and of putting a screw through the hub eyelet to fasten the counter to any machine required without bearing on the top cover 12 to produce a brake on the discs.

In the preferred counter (Figure II) each two wheels 22 have a spring 34 between them fastened to the housing case flange 17 by means of a rivet 36. These wheels move counter to each other and have their ratchet teeth reversed to each other. These teeth articulate with the free ends of the spring which keeps the wheels from fumbling and prevents them from being turned backward. The word "fumbling" is used to imply dancing forward into some intermediate or cocked position due to vibration or rapid carrying when the impact is too hard to carry the wheels just a step. In making a half step the spring of the units wheel will drop into the notch but those of any other wheels will be in the position shown in Figure III through the break in the casing. As these wheels can be placed a half step forward only when being carried, they will be held as securely against retraction or fumbling as when the spring rests down in the ratchet notch. In the type shown in Figure VIII all the wheels are locked all the time as in the preferred form whether in transit or on the half step, because they are geared together and when spring 34 drops into its notch on the units wheel ratchet no back lash can take place anywhere in the series.

A novel feature of this form of counter is the elongation of the dial window so as to allow its wheel whose numbers it exposes to move a half step without removing the number in view or presenting the next one. On the units dial the numbers are arranged similarly to those of the other disks but in addition there is a ½ interposed between each two numbers but at a different radial distance from the center (see Figures II and VII). The elongated window 23 for this units position, in the total dial of the counter, has also an L extension into the path of the halves (½). Thus in Figure II the dial reads 999999; no ½ shows in said units window. All the carrying lugs 25 are respectively against a tooth 24 in line on the numeral disk 22 adjacent the next higher denomination. When the units disk is now advanced one notch, there being twice as many notches thereon (two notches for each number) as on the succeeding disks of higher denomination, all of the disks are carried without lost motion a half step. The numbers "9", shown in the total dial, are each transferred to the opposite end of their respective elongated windows and a ½ is exposed in the L extension of the units window. The total now stands 999,999½. (Compare dial in Figure II with that in Figure III.) In this position all the disks are locked as the lugs 25 hold them against retraction. The spring on the units disk has dropped into a notch and all the other springs hold their wheels from fumbling forward by pressure as is shown in the cut away of Figure III. Advancing the units disk another notch brings all "0's" into the dial, as is shown in Figure VII, which clears the machine.

Terraced plates having thereon marginal spacing flanges, flange hubs, raceways for carrying pins and clearance springs, such as are disclosed herewith and employed to house and confine the counter discs have other advantages beside cheapness, compactness and convenience of handling and of positioning already enumerated. Chief of these is the rigidity obtained. The various crimps and turnovers embodied afford a casing, although made from the thinnest sheet metal stock, a truss-like reinforcement and rigidity only otherwise obtainable by the employment of very much heavier stock. Such consequent lightness and compactness of construction thus obtained makes these counters available in series where compactness and lightness are especially required and where their use was heretofore barred. Again the number wheels are confined by the opposed faces of the various terraces of the housing between which they are arranged and so the alignment of the wheels is attained and preserved.

Although I have shown herewith but two embodiments of my invention the details of construction thereof may be varied in many particulars, and additions, such as an attached ratchet pawl actuating arm, without departing from the spirit of my invention, I do not wish, therefore, to be understood as limiting myself to the precise arrangement, construction or combination of parts disclosed or uses enumerated.

What I claim as new and desire to secure by Letters Patent is:

1. In a counter the combination of a series of rotatably mounted counter disks parallel to each other but not coaxial and having a carrying relation between them, two terraced housing covers with their corresponding faces parallel and conforming to each other and adapted to confine between these conforming faces the respective counter disks as described.

2. In a counter the combination of a series of counter disks in carrying relation to each other and each having a bearing hole by means of which it is mounted parallel but not coaxial with the others, two terraced housing covers with their corresponding faces parallel and conforming to each other and having for each terrace a flanged up bearing hub on one of the covers and a hub hole in the other to register with it and to receive on each hub its respective disk confined between the companion terrace faces, a marginal flange on one of the covers to space it from the other and to co-operate with it to maintain the fixed relation for the disks as described.

3. In a counter the combination of a series of counter wheels mounted in carrying relation to each other, a housing for the counter, a numeral series on each wheel and on the units wheel a ½ inserted between each of the numerals but not in their wake of rotation, an elongated sight opening for each of the wheels covering a numeral and the space between it and the adjacent one and a sight opening for the ½ in the units wheel as described.

4. A counter of the class described provided with means for repeating the display of the total digit count when a half is added to the digit exposure of the units wheel and for progressively displaying the total count when other additions to the units wheel exposure are made, as described.

5. A counter of the class described capable of counting by whole numbers and halves and provided with means for progressively displaying the total digit count when any addition is made to the exposure of the units wheel when a half is expressed in connection with a digit in the units display before such transaction takes place as described.

JOSEPH H. BAIR.